United States Patent Office 2,752,266
Patented June 26, 1956

2,752,266

METHOD OF PRODUCING NON-BLOCKING, MOISTUREPROOF, HEAT-SEALABLE REGENERATED CELLULOSE FILM

Charles H. Hofrichter, Jr., Madison, and Preston M. Kempmeyer, Guilford, Conn., assignors to Olin Mathieson Chemical Corporation, a corporation of Virginia No Drawing. Application April 2, 1953,
Serial No. 346,523

5 Claims. (Cl. 117—76)

This invention is concerned with the production of moistureproof, heat-sealable, regenerated cellulose film having a top coat which imparts these properties to the film and which top coat is anchored to the base film by means of a sub-coat that does not cause sticking or "blocking" of the film when stacked or rolled upon itself prior to application of the top coat.

In the usual manufacture of moistureproof, heat-sealable regenerated cellulose film, commonly known in the trade as cellophane, it is necessary to anchor or bond the moistureproof, heat-sealable top-coating to the base film by means of a coating composition having a strong attraction for the base film and for the moistureproof, heat-sealable top-coating. This anchoring coat is applied as a sub-coat to the base film prior to the application of the top coat, and functions as an adhesion promoter between the moistureproof top coat and the base film.

This adhesion promoter is generally a thermosetting resin such as, for example, phenol formaldehyde or urea formaldehyde resin, and is usually added to the softener tank, which contains a film softening material such as glycerine, on the cellophane casting machine. The resin thus applied for anchoring purposes has the disadvantage of causing the anchored cellophane base sheet to "block," i. e., stick or bind to itself in the period intervening between the casting of the film and the subsequent coating of the cast film with the moistureproofing top coat.

In the usual commercial production of cellophane film of the type above described, the cast film, which has been coated with the anchoring resin, is rolled up and is kept for an appreciable length of time in storage or inventory before it is top-coated with the moistureproofing material. It is during this storage or delay in the manufacture of the film that the sticking or blocking of the film takes place and renders the film difficult or impossible to unroll for the top-coating operation, or at least results in film breakage during the coating operation and thereby renders that operation substantially more expensive. Other disadvantages that characterize the conventional use of the resin adhesion promoters include coagulation of the resin in the softener tank of the casting machine, and resin accummulation on the dryer rolls of the casting machine, resulting in spotted or otherwise second quality film.

In accordance with the present invention, we have discovered a method of avoiding all of the foregoing difficulties and of enabling anchoring and top-coating of cellophane film in an efficient manner and without encountering the usual blocking characteristic. This long desired result has been accomplished by the unique procedure of omitting the application of the anchoring resin on the casting machine and of subsequently performing, on the plain unanchored dried film, the anchoring and top-coating treatments in prompt succession and without any drying of the film between these two steps.

An important feature of the method of this invention is the very prompt application of the moistureproof top-coating material to the anchoring resin-coated film while the latter is still wet and before the anchoring material has had any opportunity of setting, curing, or hardening, such as to produce any sticking or blocking. The two steps are carried out in close sequential order so that the process is a substantially continuous one. The top-coating composition is applied to the film which has just been coated with the anchoring resin solution and while the film is still wet with that solution.

It will be understood from the foregoing that the improved non-blocking film of this invention may be produced promptly after the unanchored film has been cast and dried on the usual casting machine and intended initially for production of a moistureproof, heat-sealable film, or the process may be applied in similar manner to any plain unanchored cellophane or similar film which has been previously produced and stored for use or sale as such, where it is desired subsequently to impart moistureproof, heat-sealable properties to that film.

In a typical example of the process of this invention, the plain unanchored cellophane film may be coated first on one side and then on the other with an aqueous solution of anchoring resin and then in continuous manner and promptly thereafter applying on one or both sides of the wet film a top-coating composition which provides the moistureproof, heat-sealable properties, and then drying and winding up the thus treated film. It was found that the omission of any drying treatment between the anchoring and top-coating stages in the preparation of this film did not produce any deleterious effects. Also, there was no accummulation of anchoring resin or top-coating material on any of the applicator rolls.

A specific but non-limiting example of an anchoring resin suitable for use in the process of this invention is a 0.3% aqueous solution of a cationic urea formaldehyde resin sold by Hercules Powder Company under the trade name "Kymene 138," the solution being prepared by dissolving 3 grams of the 40% solids "Kymene" resin in 400 grams of water.

The concentration of the resin in the aqueous solution thereof may vary from about 0.5% to 3%, although in the usual case the concentration need not be greater than about 1%.

The resin solution can be applied to the cellophane film by means of any suitable equipment such as coating rolls or sprays, so long as the operation is followed immediately by application of the moistureproof top coat.

When using the above "Kymene" resin solution for anchoring the moistureproof top coat, the coated film had the following maximum heat seal values, which attest to the effectiveness of the anchoring process:

| Test Conditions | Strength of Heat Seals (Grams) |
|---|---|
| 75° F.; 35% R. H. | 365 |
| 75° F.; 81% R. H. | 290 |
| 75° F.; 92% R. H. | 240 |

The above heat seal values are determined in accordance with the test conditions given in R. T. Ubben Patent No. 2,147,180, issued February 14, 1939.

The term "anchoring" or equivalent as used herein, denotes securing of the top coat to the base sheet, through the intermediary of the anchoring sub-coat, in such a manner that the resulting product will withstand the deleterious effect of water or moisture and the surface coating will not loosen or flake off from the base when the product is directly in contact with water or moisture for substantial periods of time, e. g. for a period of several days or more.

The moistureproofing, heat-sealing top-coating material which is applied to the film promptly after the above described coating thereof with the anchoring resin, may be of the aqueous thermoplastic polymeric type of coating such as, for example, an interpolymer of vinylidene chloride, itaconic acid and methyl acrylate as disclosed in G. Pitzl Patent No. 2,570,478, issued October 9, 1951. We have found that this aqueous polymeric type of top coat may be successfully applied to the film while still wet with the anchoring resin composition and that these two sequentially applied coatings co-act to produce a desirable well anchored, non-blocking, moistureproof, heat-sealable coated film.

The scope of this invention is indicated in the appended claims.

We claim:

1. A method of preventing the blocking of superimposed layers of anchored non-fibrous hydrophilic cellulose film comprising applying to the uncoated film a coating of aqueous thermosetting resin solution, and promptly thereafter and while the film is still wet with said resin solution, applying an aqueous thermoplastic resin composition that provides a moistureproof, heat-sealable top coat to the film, and drying the coated film.

2. A method of applying a resinous anchoring coating on cellophane film to prevent blocking of superimposed layers of the anchored film, comprising first coating the cellophane film with an aqueous thermosetting anchor resin solution in which the resin concentration is within the range of approximately 0.5% to 3%, and promptly thereafter and while the film is still wet with said resinous solution, top-coating said film with an aqueous thermoplastic resin composition that provides a moistureproof top coat on the film and drying the coated film.

3. A method of applying a resinous anchoring coating on cellophane film to prevent blocking of superimposed layers of the anchored film when stacked or rolled upon itself will be avoided, comprising first coating the cellophane film with an aqueous thermosetting resin solution in which the resin concentration is within the range of approximately 0.5% to 1%, and promptly thereafter and while the film is still wet with said resinous solution, top-coating said film with an aqueous thermoplastic resin composition that provides a moistureproof top coat on the film and drying said coated film.

4. A method of anchoring the moistureproof top coat on cellophane film in such a manner that blocking of the film when stacked or wound upon itself will be avoided, comprising coating the cellophane film with an aqueous urea formaldehyde resin solution, and while the film is still wet with said resin solution, applying thereto an aqueous thermoplastic resin composition that covers said anchoring resin coating and imparts moistureproofing properties to the film and drying said coated film.

5. A method of anchoring the moistureproof top coat on cellophane film in such a manner that blocking of the film when stacked or wound upon itself will be avoided, comprising coating the cellophane film with an aqueous urea formaldehyde resin solution, and while the film is still wet with said resin solution, applying thereto an aqueous thermoplastic resin composition consisting of an interpolymer of vinylidene chloride, methyl acrylate and itaconic acid, that covers said anchoring resin coating and imparts moistureproofing properties to the film and drying said coated film.

References Cited in the file of this patent

UNITED STATES PATENTS

| | | |
|---|---|---|
| 2,394,009 | Pollard | Feb. 5, 1946 |
| 2,497,074 | Dudley et al. | Feb. 14, 1950 |
| 2,570,478 | Pitzl | Oct. 9, 1951 |
| 2,626,251 | James et al. | Jan. 20, 1953 |

FOREIGN PATENTS

| | | |
|---|---|---|
| 540,219 | Great Britain | Oct. 9, 1941 |